(12) United States Patent
Green

(10) Patent No.: US 11,898,761 B2
(45) Date of Patent: Feb. 13, 2024

(54) CONTROL SYSTEMS AND METHODS FOR MANAGING RATE OF HEAT DELIVERY IN HYDRONIC SYSTEMS

(71) Applicant: HARVEST THERMAL, INC., Kensington, CA (US)

(72) Inventor: Evan Green, Escondido, CA (US)

(73) Assignee: Harvest Thermal, Inc., Kensington, CA (US)

( * ) Notice: Subject to any disclaimer, the term of this patent is extended or adjusted under 35 U.S.C. 154(b) by 317 days.

(21) Appl. No.: 17/191,645

(22) Filed: Mar. 3, 2021

(65) Prior Publication Data
US 2021/0278093 A1    Sep. 9, 2021

Related U.S. Application Data

(60) Provisional application No. 62/985,023, filed on Mar. 4, 2020.

(51) Int. Cl.
| | | |
|---|---|---|
| *F24D 19/10* | (2006.01) | |
| *F24H 1/14* | (2022.01) | |
| *F24H 1/40* | (2022.01) | |
| *F24H 9/00* | (2022.01) | |
| *F24D 3/02* | (2006.01) | |

(Continued)

(52) U.S. Cl.
CPC .......... *F24D 19/1072* (2013.01); *F24D 3/02* (2013.01); *F24D 3/08* (2013.01); *F24H 1/14* (2013.01); *F24H 1/40* (2013.01); *F24H 9/0015* (2013.01); *G05B 15/02* (2013.01); *F24D 2220/0207* (2013.01); *F24D 2220/042* (2013.01); *F24D 2220/044* (2013.01); *F24D 2240/00* (2013.01)

(58) Field of Classification Search
CPC .......... F24D 19/1066; F24D 3/02; F24D 3/08; F24D 2220/0207; F24D 2220/042; F24D 2220/044; F24D 2240/00; F24H 1/14; F24H 1/40; F24H 9/0015; G05B 15/02
See application file for complete search history.

(56) References Cited

U.S. PATENT DOCUMENTS

| | | | | |
|---|---|---|---|---|
| 5,617,994 A | * | 4/1997 | Fiedrich | F24D 10/006 237/63 |
| 7,658,335 B2 | * | 2/2010 | Johnson, Jr. | F24D 12/02 122/448.3 |

(Continued)

*Primary Examiner* — Ramesh B Patel
(74) *Attorney, Agent, or Firm* — Kanika Radhakrishnan; Evergreen Valley Law Group

(57) ABSTRACT

The present disclosure provides a method for controlling rate of heat delivery in a hydronic system, which includes receiving, by a control unit, at least a first temperature, a second temperature from two spatially separated points in the hydronic system and a flow rate. The two spatially separated points correspond to inlet of heat transfer device and outlet of heat transfer device. The method also includes calculating at predefined interval, by the control unit, an actual rate of heat delivery to the heat transfer device based on flow rate and temperature difference between the two spatially separated points. The control unit determines heat delivery rate difference between actual rate of heat delivery and target rate of heat delivery. The control unit adapts flow rate of fluid into inlet of heat transfer device based on heat delivery rate difference to maintain target rate of heat delivery in heat transfer device.

20 Claims, 9 Drawing Sheets

(51) Int. Cl.
*F24D 3/08* (2006.01)
*G05B 15/02* (2006.01)

(56) References Cited

U.S. PATENT DOCUMENTS

| | | | |
|---|---|---|---|
| 2008/0179415 A1* | 7/2008 | Johnson | F24D 19/1009 |
| | | | 237/8 A |
| 2009/0038668 A1* | 2/2009 | Plaisted | H01L 31/0521 |
| | | | 700/274 |
| 2012/0061052 A1 | 3/2012 | Alessandrelli et al. | |
| 2013/0048114 A1* | 2/2013 | Rothman | F24D 19/1012 |
| | | | 137/551 |
| 2017/0030593 A1* | 2/2017 | O'Connor | F24D 19/10 |
| 2017/0219219 A1* | 8/2017 | Miller | F24D 3/02 |
| 2017/0299200 A1* | 10/2017 | Mercier, Sr. | F24D 19/1015 |
| 2018/0156473 A1* | 6/2018 | Keber | F24D 19/0075 |
| 2018/0245801 A1* | 8/2018 | Schindler | F24H 15/12 |
| 2018/0363801 A1 | 12/2018 | Prajzner et al. | |
| 2019/0264947 A1* | 8/2019 | Reider | F24F 11/84 |
| 2019/0277523 A1* | 9/2019 | Wallace | F28F 27/00 |
| 2020/0236870 A1* | 7/2020 | Lys | A01G 9/246 |
| 2021/0088231 A1* | 3/2021 | Alsberg | F24D 3/1066 |
| 2021/0116135 A1* | 4/2021 | Deivasigamani | F24H 9/0005 |
| 2022/0082288 A1* | 3/2022 | Revilla | F24F 11/80 |
| 2022/0373226 A1* | 11/2022 | Cunningham | F24D 19/1066 |

\* cited by examiner

CONTROL SYSTEMS AND METHODS FOR MANAGING RATE OF HEAT DELIVERY IN HYDRONIC SYSTEMS

TECHNICAL FIELD

The present disclosure relates to hydronic systems, and more particularly to control systems and methods for measuring and managing rate of heat delivery in hydronic heating and cooling systems.

BACKGROUND

Hydronic systems are typically thermo-fluid dynamic systems that use a fluid as heat-transfer medium for heating and cooling homes, commercial, and/or industrial spaces. In general, the hydronic systems employ fluid as a heat transfer medium for heating or cooling the interiors of a building (e.g., homes, industrial facilities). More often, the hydronic systems employ different control techniques to cool or heat the fluid with a boiler or chiller depending on the requirements.

Conventional hydronic systems can use energy sources obtained by the combustion of natural gas, propane, coal, fuel oil, wood, and other fuels for powering boilers to heat fluid. This combustion results in the emission of greenhouse gases (GHG) and potentially other pollutants including particulates, ozone, nitrogen dioxide, sulphur dioxide, etc. Alternatively, electricity can be used, for example to operate heat pumps for heating or cooling fluid, or electric resistance devices for heating fluid. Electric hydronic systems utilize the energy generated by power plants, many of them powered by the combustion of fossil fuels, which also generates GHG and the other air pollutants listed above. Emissions from grid-supplied electricity vary by time of day and day of the year and can range from zero when the marginal generator is renewable, hydro, or nuclear, to very high when the marginal generator is a peak power plant at times of peak grid demand.

Further, as hydronic systems move thermal energy from one location to another, the rate of heat delivery is important for the efficient management of the hydronic system. Moreover, as some hydronic systems employ thermal storage, the rate of heat delivery plays an important role in the optimal use of storage capacity. Some hydronic systems employ load shifting to generate heat at a time instant that may be different from a time instant when it will be delivered. In such hydronic systems, the rate of heat delivery is an important parameter that can be optimized to achieve energy efficiency and cost savings. As time-varying electricity rates become increasingly common, the cost incurred for operating electric hydronic systems also varies by time of operation. Therefore, the rate of heat delivery plays a crucial role for an efficient, low-emission, and cost-effective operation of an electric hydronic system.

In view of the above, there exists a technical need for control systems and techniques that can measure and manage the rate of heat delivery along with providing other technical advantages.

SUMMARY

Various embodiments of the present disclosure provide control methods and systems for measuring and managing the rate of heat delivery in the hydronic system.

In an embodiment, a hydronic system is disclosed. The hydronic system includes a control unit for managing a rate of heat delivery across two spatially separated points in the hydronic system. The control unit includes a communication module, a memory and a processing module. The communication module is configured to: (1) receive at least a first temperature and a second temperature of a fluid from a first point and a second point, respectively in the hydronic system, wherein the first point and the second point correspond to the two spatially separated points, and (2) receive a flow rate of the fluid across the two spatially separated points. The processing module is communicably coupled to the memory and the communication module. The processor is configured to execute the stored instructions to cause the hydronic system to perform at least: (1) calculating an actual rate of heat delivery in the two spatially separated points based, at least in part, on flow rate and temperature difference of the fluid in the two spatially separated points, (2) determining a heat delivery rate difference between the actual rate of heat delivery and a target rate of heat delivery, and (3) adapting at least the flow rate of the fluid flowing between the two spatially separated points based, at least in part, on the heat delivery rate difference to maintain the target rate of heat delivery.

In another embodiment, a hydronic system is disclosed. The hydronic system includes a heat transfer device, at least one pump and a control unit. The at least one pump is operatively coupled to a storage tank for pumping fluid from the storage tank to the heat transfer device. The control unit is operatively coupled to the heat transfer device and the at least one pump. The control unit is configured to perform the following steps at predefined intervals: (1) receiving at least a first temperature and a second temperature from two spatially separated points in the hydronic system, wherein the first temperature corresponds to temperature of the fluid entering an inlet of the heat transfer device and the second temperature corresponds to temperature of the fluid leaving an outlet of the heat transfer device, (2) receiving a flow rate of the fluid in the heat transfer device, (3) calculating a temperature difference between the two spatially separated points in the hydronic system based, at least in part, on the first temperature and the second temperature, (4) calculating an actual rate of heat delivery in the heat transfer device based, at least in part, on the flow rate and the temperature difference, (5) determining a heat delivery rate difference between the actual rate of heat delivery and a target rate of heat delivery, (6) calculating a target pumping rate based, at least in part, on the heat delivery rate difference, and (7) operating the at least one pump at the target pumping rate for adapting at least the flow rate of fluid into the inlet of the heat transfer device to maintain the target rate of heat delivery in the heat transfer device.

In yet another embodiment, a method for controlling rate of heat delivery in a hydronic system is disclosed. The method includes receiving, by a control unit, at least a first temperature and a second temperature from two spatially separated points in the hydronic system. The two spatially separated points correspond to an inlet of a heat transfer device and an outlet of the heat transfer device. The method includes receiving, by the control unit, a flow rate of the fluid in the heat transfer device. The method also includes calculating at a predefined interval, by the control unit, a temperature difference between the two spatially separated points in the hydronic system based, at least in part, on the first temperature and the second temperature. The method further includes calculating at the predefined interval, by the control unit, an actual rate of heat delivery to the heat transfer device based, at least in part, on the flow rate and the temperature difference. The method includes determining at the predefined intervals, by the control unit, a heat delivery rate difference between the actual rate of heat delivery and a target rate of heat delivery. The method also includes adapting, by the control unit, at least the flow rate of fluid into the inlet of the heat transfer device based, at least in part, on the heat delivery rate difference to maintain the target rate of heat delivery in the heat transfer device.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

Figure 1:
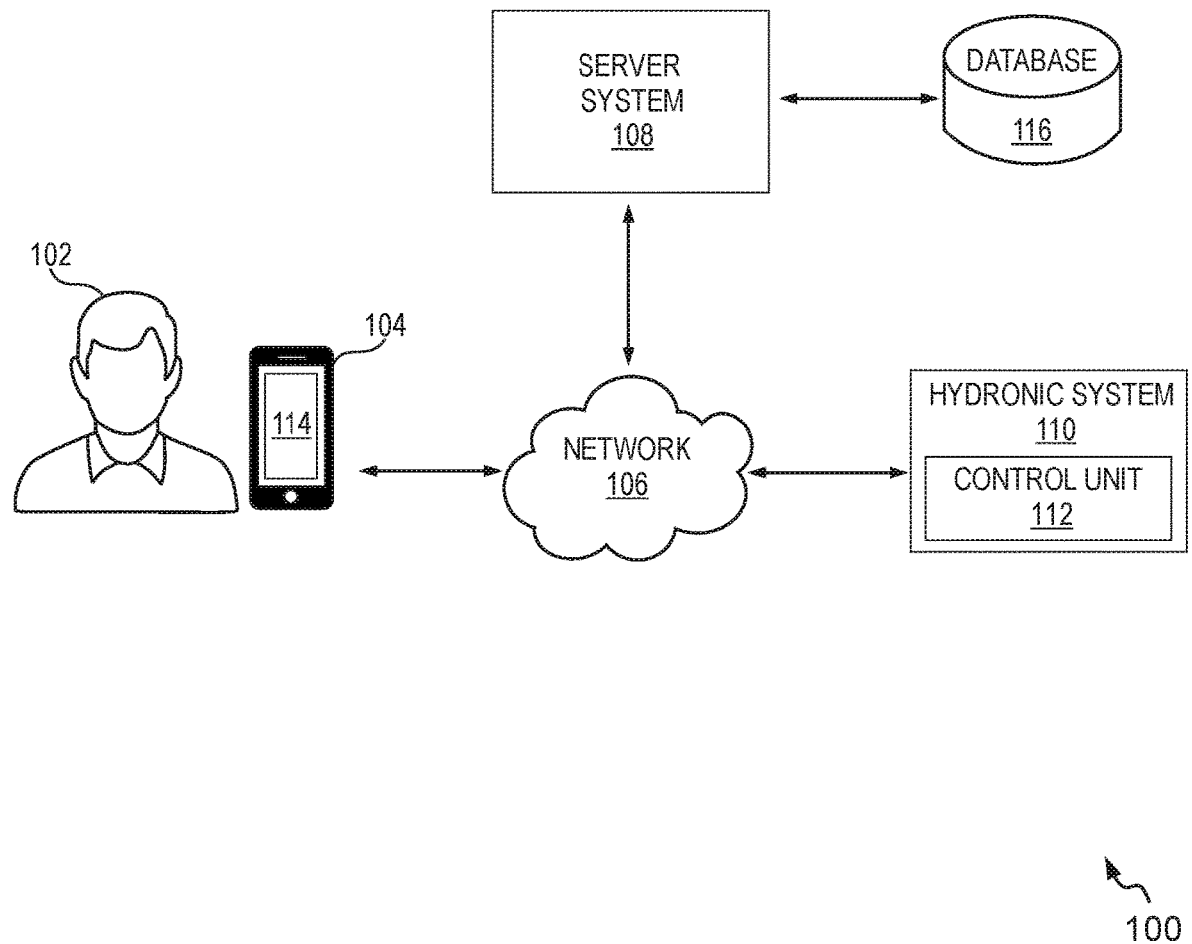
FIG. 1 is an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term 'hydronic' as used herein refers to the use of a fluid such as, water, glycol or steam as the heat-transfer medium in heating and cooling systems for buildings such as, homes, commercial and industrial facilities.

Overview

Various embodiments of the present disclosure provide systems and methods for measuring and managing the rate of heat delivery in a hydronic system configured to condition an enclosure as per requirement. More specifically, embodiments of the present disclosure provide a control unit that adapts operation of one or more components of the hydronic system for managing the rate of heat delivered to the hydronic system. Such techniques for managing the rate of heat delivery in hydronic systems improve the operational and energy efficiency.

In an example, the present disclosure describes a method performed by a control unit of the hydronic system. The control unit receives at least a first temperature and a second temperature of a fluid from two spatially separated points in the hydronic system. The two spatially separated points correspond to an inlet of a heat transfer device and an outlet of the heat transfer device. The heat transfer device may be a radiator or a hydronic panel that acts as a heat exchanger to transfer thermal energy from one medium to another for heating or cooling the enclosure. Further, the control unit is configured to receive a flow rate of the fluid in the heat transfer device. A storage tank may store the fluid that may be pumped to the heat transfer device for heating/cooling.

In an embodiment, the control unit is configured to calculate a temperature difference of the fluid between the two spatially separated points (i.e., across ends of the heat transfer device) in the hydronic system based on the first temperature and the second temperature of the fluid at a predefined interval. The temperature difference indicates a difference in fluid temperature between the inlet of the heat transfer device and the outlet of the heat transfer device. The control unit calculates an actual rate of heat delivery to the heat transfer device based on the flow rate and the temperature difference. The actual rate of heat delivery determines an amount of heat or thermal energy transferred per unit time via the fluid to the heat transfer device. Further, the delivery rate difference between the actual rate of heat delivery and a target rate of heat delivery is determined by the control unit. In some example embodiments, the control unit is configured to determine the target rate of heat delivery from temperature requirements of an enclosure.

The control unit is configured to adapt the flow rate of fluid into the inlet of the heat transfer device based on the heat delivery rate difference to maintain the target rate of heat delivery in the heat transfer device. In one embodiment, the control unit calculates a target flow rate based on the heat delivery rate difference. Further, the control unit is configured to operate a flow modulator based on the target flow rate. The flow modulator is configured at the inlet of the heat transfer device. In another embodiment, the control unit is configured to calculate a target pumping rate for operating a pump based on the heat delivery rate difference. The pump can be operatively coupled to the storage tank for pumping fluid from the storage tank to the heat transfer device. The pump is operated at the target pumping rate for adapting the flow rate of the fluid into the inlet of the heat transfer device.

In some example embodiments, the control circuit is configured to calculate a target first temperature at the outlet of the heat transfer device based on the heat delivery rate difference. As the fluid flow rate via the inlet of the heat transfer device affects the temperature of the fluid, the control circuit calculates a desired fluid temperature at the outlet of the heat transfer device. Further, a target pumping rate for operating the pump is calculated based on the target first temperature. In one embodiment, the control circuit operates the pump at the target pumping rate for adapting the flow rate of fluid via the inlet of the heat transfer device. In an alternate embodiment, the control circuit operates the flow modulator based on the target flow rate for adapting the flow rate of fluid via the inlet of the heat transfer device.

Although process steps, method steps or the like in the disclosure may be described in sequential order, such processes and methods may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

Various example embodiments of the present disclosure are described hereinafter with reference to FIG. 1 to FIG. 7.

Figure 2A:
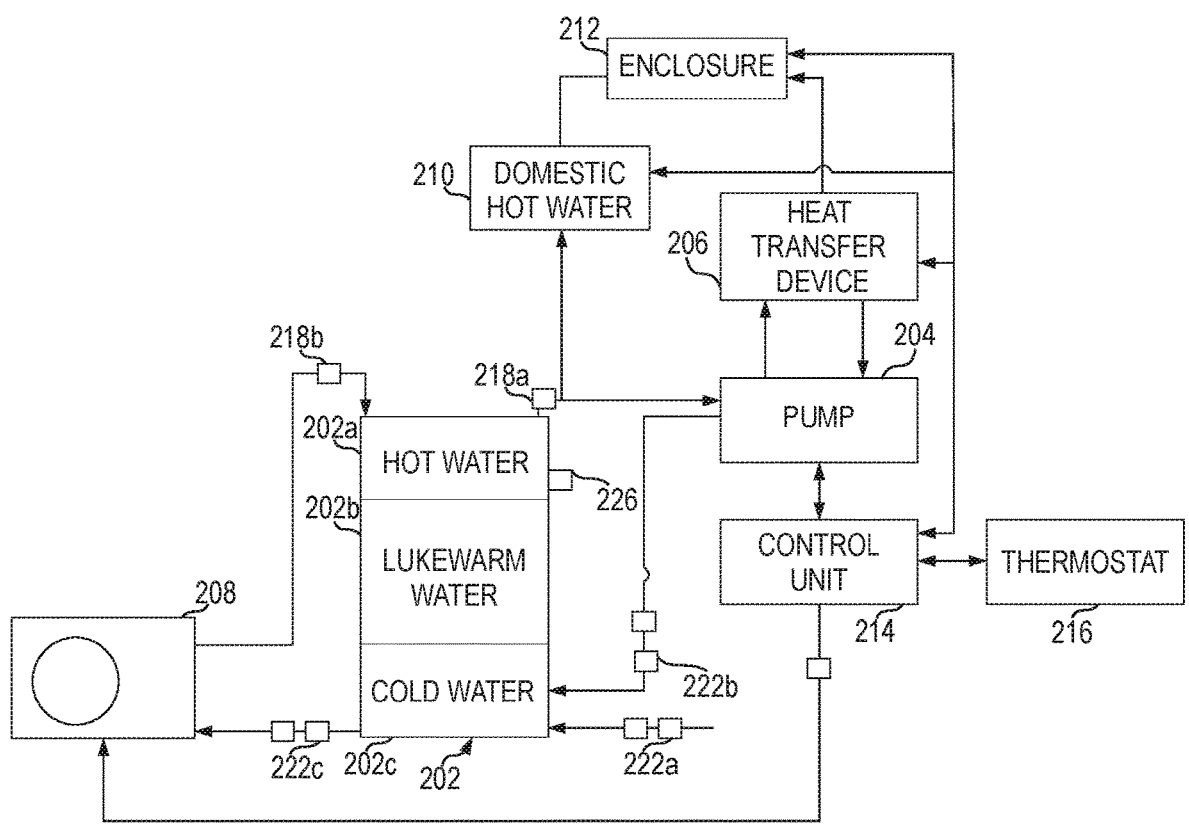
FIG. 2A is a schematic representation of a hydronic system, in accordance with an example embodiment of the present disclosure.

FIG. 1 is an example representation of an environment 100 related to at least some example embodiments of the present disclosure. The environment 100 includes a user 102 interacting with a hydronic system 110 (for e.g. as shown in FIG. 2A). The user 102 may be an individual or an entity, which is in need of conditioning (i.e., heating/cooling) an indoor space. The user 102 is associated with a device 104, for providing user input for operating the system 110 via a network 106. The network 106 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof.

The user input from the user 102 may include temperature requirements, a rate of heat delivery, variation in the temperature of conditioning the indoor space (see, enclosure 212), timing information for temperature control or any other information required for operation of the hydronic system 110. The user 102 uses an interactive application (hereinafter referred to as "application 114") on his/her device 104 to provide the user input to the hydronic system 110 for operating the hydronic system 110 (e.g., set temperature to 70° F.). The device 104 may be any electronic device such as, but not limited to, a personal computer (PC), a tablet device, a Personal Digital Assistant (PDA), a voice activated assistant, wearable devices, a Virtual Reality (VR) device, a smartphone and a laptop.

The server system 108 is configured to host and manage the application 114, which is accessible to the device 104. The application 114 may be accessible through a website associated with the server system 108, so that the user 102 may access the website over the network 106 using Web browser applications installed in the device 104 and, thereafter perceive to operate the hydronic system 110. In an embodiment, the server system 108 is configured to facilitate instances of the application 114 to the device 104, upon receiving a request for accessing the application 114. The server system 108 upon receiving the request allows instances of the application 114 to be downloaded into the device 104 for accessing the application 114. In one configuration, the application 114 is also configured to generate and dynamically update a dashboard (not shown in Figures) by including the user input provided by the user 102. In another configuration, the application 114 is also configured to generate and dynamically update the dashboard by including estimated costs associated with operation of the hydronic system 110 based on the user input.

The environment 100 further includes a database 116 configured to store information pertaining to the user input provided by the user 102. The database 116 may also be configured to store data pertaining to the determined temperatures, determined heat delivery rate, pumping rate, flow rate, capacities of the storage tanks, estimated costs, power savings and the like. The database 116 may be maintained by a third party or embodied within the server system 108.

In one embodiment, the hydronic system 110 includes a control unit 112 that controls operation of the hydronic system 110 based on the user input provided via the application 114. It shall be noted that the control unit 112 can be a standalone component operating apart from the hydronic system 110 for controlling operations of the hydronic system 110. However, in other embodiments, the control unit 112 may actually be incorporated, in whole or in part, into one or more parts of the environment 100, for example, the server system 108. Further, the control unit 112 should be understood to be embodied in at least one computing device which may be specifically configured, via executable instructions, to perform as described herein, and/or embodied in at least one non-transitory computer readable media.

The hydronic system 110 is configured to perform one or more of the operations described herein. In particular, the control unit 112 is configured to adapt one or more parameters of the hydronic system 110 for managing the rate of heat delivery in the hydronic system 110. In one example, the user 102 may preset a rate of heat delivery (e.g., 10,000 BTU/hr) for the hydronic system 110 for cost savings. During use, the user 102 may provide the user input to increase temperature of the indoor space on a cold day. In such scenarios, increasing ambient room temperature may require a higher rate of heat delivery. As such, the control unit 112 adapts a parameter (e.g., flow rate, temperature) associated with the rate of heat delivery to increase the rate of heat delivery until the temperature requirements provided by the user 102 are met.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2B:
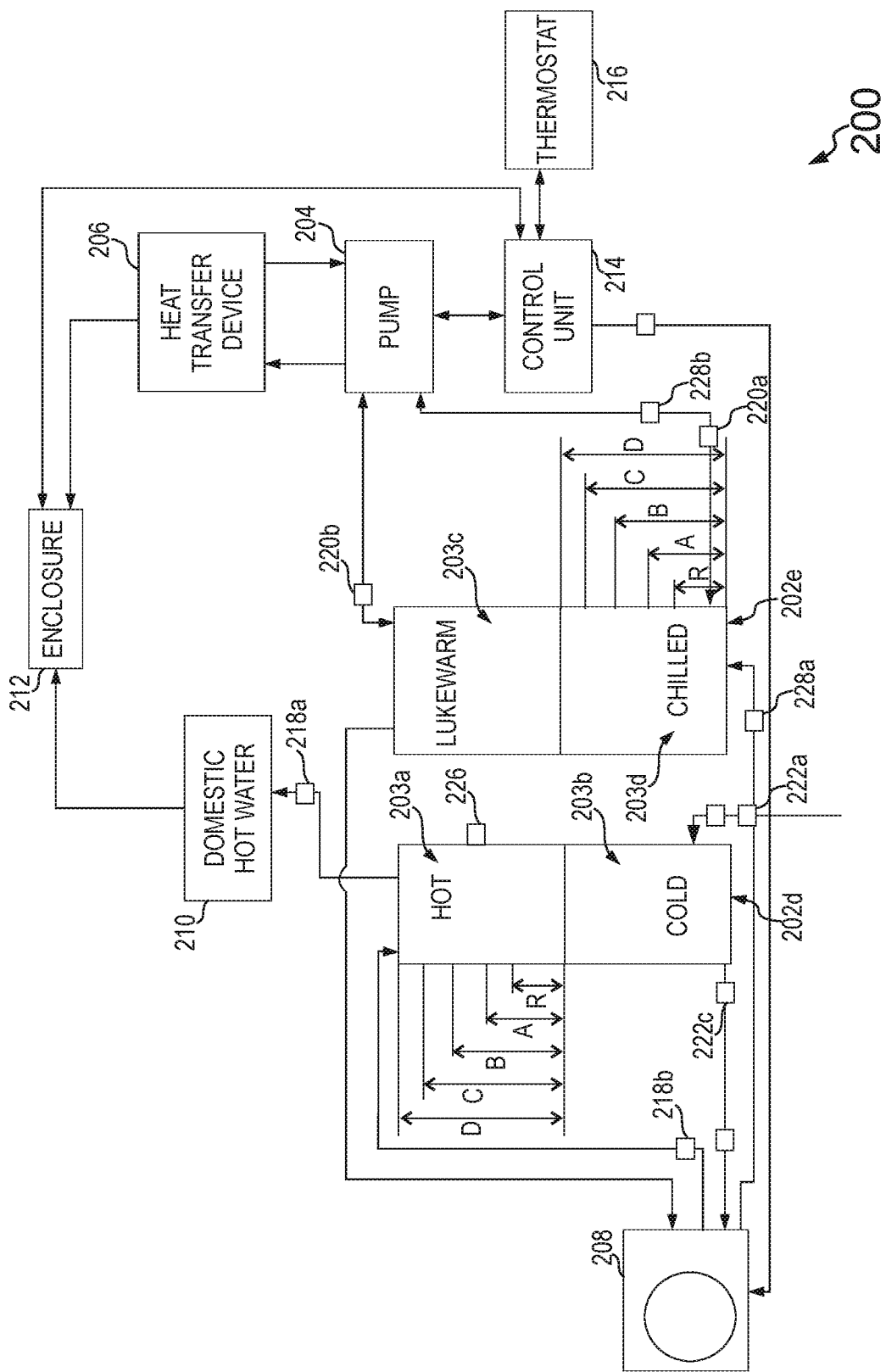
FIG. 2B is a schematic representation of a hydronic system, in accordance with another example embodiment of the present disclosure.

FIGS. 2A and 2B are schematic representations of the hydronic system 200, in accordance with some example embodiments of the present disclosure. The system 200 includes a thermal storage tank 202 configured to store fluid therein. The thermal storage tank 202 may be divided into a compartment 202a (i.e. a top portion) for storing hot fluid, a compartment 202b for storing warm fluid and a compartment 202c (i.e. a bottom portion) for storing cold fluid. The thermal storage tank 202 may be configured with a thermal shielding surface for maintaining the temperature of the fluid therein. More specifically, the compartments 202a-202c may be formed due to the temperature difference between the hot fluid, the warm fluid and the cold fluid. In general, a thermocline layer (referenced as a line within the tank 202) forms the compartments 202a-202c due to significant difference in temperatures.

In one implementation, the hot fluid may be fluid heated to a temperature between 130° F.-170° F., the lukewarm fluid may be fluid at room temperature (e.g., 68° F.-72° F.), and the cold fluid may be the fluid cooled to temperatures of 50° F. or any other temperature as per requirement.

The thermal storage tank 202 is fluidically coupled to a pump 204. The pump 204 is further fluidically coupled via conduits, to a heat transfer device 206 (also referred to as 'a thermal distributor 206'), a heat pump unit 208, a domestic hot fluid tank 210 and the enclosure 212. As such, the pump 204 is configured to circulate or route the hot fluid, the cold fluid and the lukewarm fluid suitably within the system 200. Examples of the pump 204 include, but not limited to, a positive displacement pump, a peristaltic pump, a centrifugal pump, and the like as per design feasibility and requirement.

In one configuration, the thermal storage tank 202 may be divided into a first storage tank 202d and a second storage tank 202e (shown in FIG. 2B). As shown in FIG. 2B, the first storage tank 202d may be configured to store hot fluid at a top portion 203a and cold fluid at a bottom portion 203b. The thermocline layer will separate the hot fluid and the cold fluid. The second storage tank 202e may be configured to store lukewarm fluid in a top portion 203c and chilled fluid in a bottom portion 203d. The thermocline layer will separate the lukewarm fluid and the chilled fluid. The first storage tank 202d and the second storage tank 202e may be fluidically coupled to the pump 204 for enabling circulation of the hot fluid and the cold fluid suitably.

Further, the system 200 may be configured with a first set of flowmeters 222a, 222b and 222c mounted at an inlet and outlet of the first storage tank 202d. The first set of flowmeters 222a, 222b and 222c are configured to monitor the volume of the fluid entering and leaving the first storage tank 202d over time and thereby enable the control unit 214 to determine the volume of hot fluid in the first storage tank 202d. The first set of flowmeters 222a, 222b and 222c may be one of an optical sensor, a mechanical sensor or any other sensor configured for monitoring the fluid flow within the conduits entering and leaving the first storage tank 202d. The system 200 may also include a first set of temperature sensors 218a and 218b mounted to the conduit exiting and entering the portion of the first storage tank 202d containing the hot fluid. The first set of temperature sensors 218a, 218b are configured to monitor the temperature of the fluid exiting or entering the hot first storage tank 202d. In one configuration, the first set of flowmeters 222a, 222b and 222c and the temperature sensors 218a, 218b may also be suitably incorporated in the thermal storage tank 202 (not shown in Figures).

The second storage tank 202e may be configured with a second set of flowmeters 228a and 228b mounted at an inlet and an outlet of the portion containing the chilled fluid. The second set of flowmeters 228a and 228b are configured to monitor the volume of the chilled fluid entering and leaving the second storage tank 202e over time and thereby, enabling the control unit 214 to determine the volume of chilled fluid in the second storage tank 202e. The second set of flowmeters 228a and 228b may be one of an optical sensor, a mechanical sensor or any other sensor configured for monitoring the chilled fluid flowing within the conduits entering and leaving the second storage tank 202e. The system 200 also includes a second set of temperature sensors 220a and 220b (for e.g. as shown in FIG. 2B) mounted to conduit exiting/entering a portion of the second storage tank 202e containing the chilled fluid and exiting/entering the portion of the second storage tank 202e containing the lukewarm fluid. The second set of temperature sensors 220a and 220b are configured to monitor the temperature of the fluid exiting or entering the second storage tank 202e. In one configuration, the second set of flowmeters 228a and 228b (for e.g. as shown in FIG. 2B) and the temperature sensors 220a and 220b may be suitably incorporated in the thermal storage tank 202.

Further, the system 200 includes a first temperature sensor 226 mounted to the first storage tank 202d. The first temperature sensor 226 is configured to monitor the temperature of the hot fluid within the first storage tank 202d. In one configuration, the conduit extending from the first storage tank 202d for supplying the hot fluid, may be directly connected to the enclosure 212 (not shown in Figures). In one configuration, the conduit extending from the second storage tank 202e for supplying the chilled fluid to the heat transfer device 206 may be directly connected instead to a domestic hot fluid tank 210 (not shown in Figures). The heat transfer device 206 on receiving either of the hot fluid or the chilled fluid via the pump 204 distributes the heat content to the enclosure 212 for conditioning. Examples of the heat transfer device 206 may include but are not limited to, a blower, a radiator or hydronic panel configured for distributing the heat content into the enclosure 212. The heat transfer device 206 includes a plurality of heat transfer components connected together, for example, plurality of radiators connected in series so as to provide adequate heating/cooling to the enclosure.

The system 200 also includes the heat pump unit 208 configured for generating either the hot fluid or the chilled fluid. The hot fluid and the chilled fluid generated in the heat pump unit 208 is routed back to the thermal storage tank 202, the first storage tank 202d or the second storage tank 202e, respectively. In one configuration, the heat pump unit 208 receives cold fluid from (i.e. the bottom portion) the first storage tank 202d which would be heated for generating the hot fluid. The generated hot fluid is routed to the first storage tank 202d (i.e. the top portion), for recharging the hot fluid. In another configuration, the heat pump unit 208 receives lukewarm fluid from (i.e. the top portion) the second storage tank 202e, which would be cooled to generate the chilled fluid. The chilled fluid is circulated back to the second storage tank 202e (i.e. to the bottom portion).

The system 200 also includes a control unit 214 communicably coupled with the thermal storage tank 202 (shown in FIG. 2A) or the first storage tank 202d, and the second storage tank 202e. The control unit 214 is also communicably coupled to the pump 204, the heat transfer device 206, the domestic hot fluid tank 210, the heat pump unit 208 and the enclosure 212. The control unit 214 is also configured to receive the user input from the user 102, based on which the control unit 214 may operate the system 200. Additionally, the hydronic system 200 includes a thermostat 216 that senses any change in temperature from the required thermal value (as preset by the user 102) or temperature value in the system 200 suitably, and provides such data to the control unit 214. In one implementation, the control unit 214 may automatically determine the requirements of the enclosure 212 and accordingly, operate the system 200 for conditioning the enclosure 212 suitably. To that effect, the control unit 214 determines a target rate of heat delivery across the heat transfer device 206 based on the thermal requirements either preset by the user 102 or automatically for conditioning the enclosure 212. Further, the control unit 214 is configured to control operations of the components in the system 200 for ensuring optimal operational efficiency by managing the rate of heat delivery in the hydronic system 200, while incurring minimal operation costs, emissions or any other parameter, which would be further explained with reference to FIGS. 3-6.

As such, when the heat transfer device 206 is configured with thermal storage capacity, the rate of heat delivery is important for management and optimal use of storage capacity. Further, if the heat transfer device 206 employs load shifting techniques, the rate of heat delivery needs to be optimized for minimizing atmospheric carbon generation and usage cost. This optimization is performed by the control unit 214. An example of managing the rate of heat delivery in hydronic system 200 is shown and explained with reference to FIGS. 3A-3C.

Figure 3A:
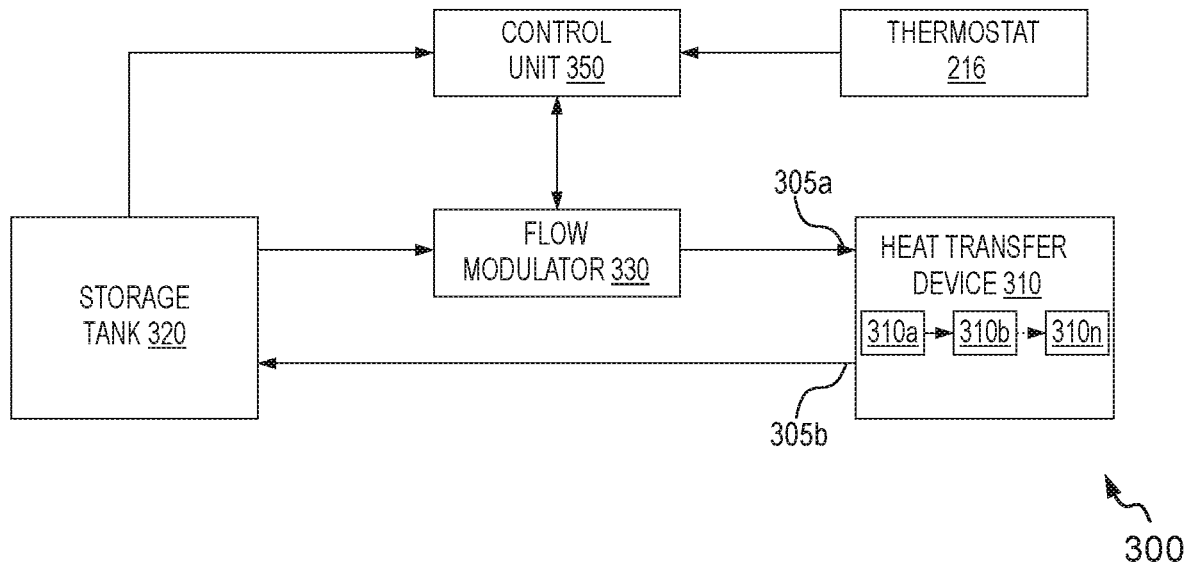
FIG. 3A is a simplified block diagram representation of a hydronic system for managing rate of heat delivery, in accordance with an embodiment of the present disclosure.

FIG. 3A is a simplified block diagram representation of a hydronic system 300 for managing the rate of heat delivery in a heat transfer device, in accordance with an embodiment of the present invention. The hydronic system 300 is a simplified example representation of the hydronic system 200. The number and arrangement of devices, and/or components shown in FIG. 3A are provided as an example. There may be additional devices, and/or components; fewer devices, and/or components; different devices, and/or components; and/or differently arranged devices, and/or components than those shown in FIG. 3A. Further, operations of one or more components may be performed using software, hardware or a combination thereof.

The hydronic system 300 includes at least a heat transfer device 310, a storage tank 320, at least one flow modulator 330 and a control unit 350.

The storage tank 320 is configured to supply fluid to the heat transfer device 310 via conduits. The storage tank 320 can be a thermal storage tank 202 as shown in FIG. 2A or the thermal storage tanks 202d, 202e shown and explained with reference to FIG. 2B. The heat transfer device 310 is an example of the heat transfer device 206 shown and explained with reference to FIGS. 2A and 2B. The heat transfer device 310 is a type of heat exchanger used to transfer thermal energy from one medium to another medium for heating or cooling an indoor space i.e., the enclosure 212. More specifically, the heat transfer device 310 is a thermal distributor including a distribution system such as a radiant floor, wall, ceiling, wall-mounted radiators or any other such system for conditioning the enclosure 212. Examples of the heat transfer device 310 include, but not limited to, radiators, hydronic panels, fan convectors, heat emitters, air handlers, radiant surfaces and the like. The fluid enters the heat transfer device 310 via an inlet 305a and leaves the heat transfer device 310 via an outlet 305b.

Generally, rate of heat of heat delivered to the heat transfer device 310 varies over time based on ambient temperature variations or user requirements (i.e., temperature requirements) thereby resulting in an increased rate of heat delivery that affects optimum performance and increases operational costs of the hydronic systems 300/360/370.

"Rate of heat delivery" as used herein is the amount of heat that is transferred per unit of time in some material i.e., fluid in the hydronic systems 300/360/370. Factors that affect the rate of heat delivery in the hydronic systems 300/360/370 include the thermal conductivity of the fluid, temperature difference of the fluid across spatially separated points and flow rate of the fluid in the hydronic system 300/360/370. Different materials have greater or lesser resistance to heat transfer, making them better insulators or better conductors.

The management of the rate of heat delivery is explained hereinafter with reference to the heat transfer device 310, i.e. radiator or heat emitter that employs heat transfer mechanisms such as, convection, conduction, thermal radiation, and evaporative cooling for transferring heat to the fluid that conditions the enclosure based on user requirements (i.e., user input) as will be explained in further detail later. However, it shall be noted that the rate of heat delivery across other sub-systems of the hydronic system 300/360/370 or any heating and cooling systems can be measured and managed in the same or substantially similar way with same or substantially similar components and has not been explained herein for the sake of brevity.

The heat transfer device 310 may include a single heat exchanger, for example, a radiator, or a number of heat exchangers (i.e., a plurality of radiators) connected in series configuration to heat/cool the indoor space as per user requirement. In this example representation, a plurality of radiators 310a, 310b, . . . 310n (hereinafter referred to as 'the heat transfer device 310') is connected together in series. It shall be noted that the number of heat exchangers may not be necessarily connected in series but may be connected in parallel or any combination thereof as per design feasibility and requirement. Accordingly, the rate of heat delivery across each radiator (e.g., radiator 310a) may be monitored and adapted as per requirements. It is understood that other devices/components of the hydronic systems 200/300 may be monitored similarly for managing the rate of heat delivery within the hydronic system 200/300. Furthermore, rate of heat delivery across multiple devices/components of the hydronic system 200/300 can be similarly monitored to optimize the rate of heat delivery that may result in cost savings and energy efficiency.

In some example embodiments the hydronic systems 200/300 may include a forced air heat delivery component, for example, an air handler (not shown in Figures). Such forced air systems may enable an additional control component that measures and or controls the flow of air in the hydronic systems 200/300. The rate of airflow may be measured or controlled to effect change in rate of heat delivery as performed with measuring and managing the flow rate of the fluid in the hydronic systems 200/300. In such an implementation, it may be possible that flow rate of both fluid and air can be controlled to achieve the desired rate of heat delivery. Moreover, utilizing two control elements allows further optimizations, for example, to minimize airflow disturbance in the conditioned space.

The control unit 350 is configured to control operations of the components in the hydronic system 300 for managing the rate of heat delivery in the heat transfer device 310. The control unit 350 is an example of the control unit 214 shown and explained with reference to FIGS. 2A and 2B. The operations of the control unit are explained next with reference to FIG. 4.

Figure 4:
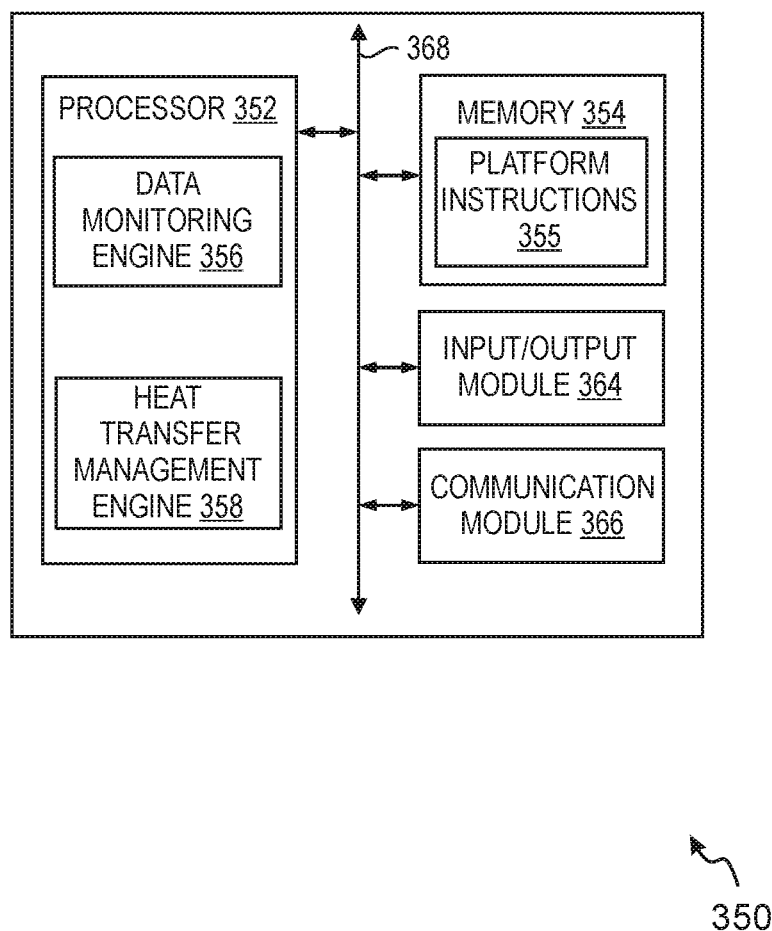
FIG. 4 is a block diagram of a control unit configured to manage rate of heat delivery in the hydronic systems of FIGS. 2A-2B, 3A-3C, in accordance with an embodiment of the present disclosure.
Figure 5:
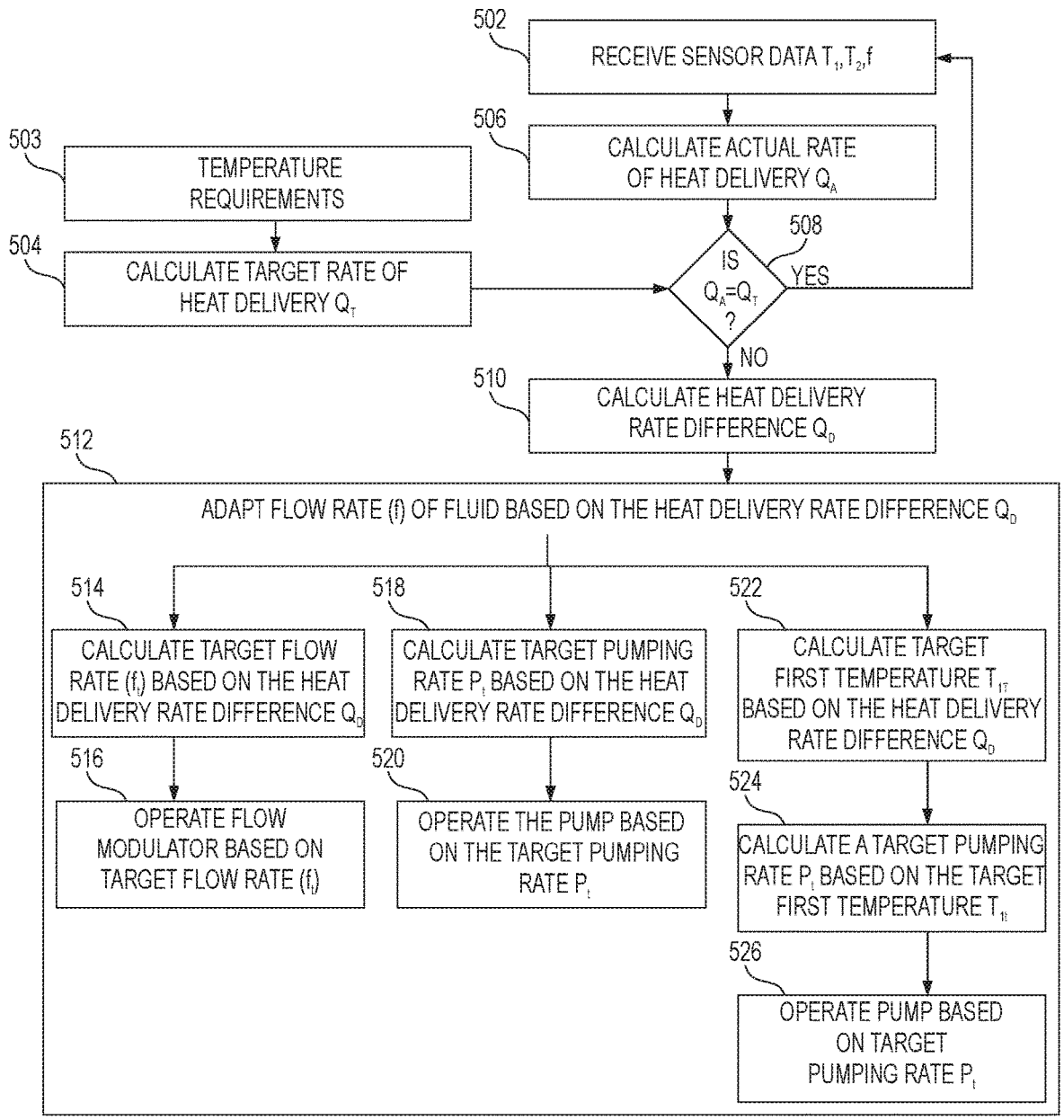
FIG. 5 is a flow diagram illustrating a method for managing rate of heat delivery to a hydronic system, in accordance with an embodiment of the present disclosure.

FIG. 4 is a block diagram of the control unit 350 configured to manage the rate of heat delivery in the hydronic system 300/360/370, in accordance with an embodiment of the invention. The control unit 350 is an example of the control unit 214 shown and explained with reference to FIGS. 2A-2B.

The term 'manage' as used herein refers to regulation or modulation of the rate of heat delivery in the hydronic system 200/300/360/370, for example, maintaining the rate of heat delivery across the heat transfer device 206 or the heat transfer device 310 even with change in user input (e.g., temperature change). In one embodiment, the control unit 350 may be embodied in the server system 108 accessible over a communication network, such as the communication network 106 shown in FIG. 1.

The control unit 350 includes at least one processor, such as a processing module 352 and a memory 354. It is noted that although the control unit 350 is depicted to include only one processor, the control unit 350 may include more number of processors therein. In an embodiment, the memory 354 is capable of storing machine executable instructions, referred to herein as platform instructions 355. Further, the processing module 352 is capable of executing the platform instructions 355. In an embodiment, the processing module 352 may be embodied as a multi-core processor, a single core processor, or a combination of one or more multi-core processors and one or more single core processors. For example, the processing module 352 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 352 may be configured to execute hard-coded functionality. In an embodiment, the processing module 352 is embodied as an executor of software instructions, wherein the instructions may specifically configure the processing module 352 to perform the algorithms and/or operations described herein when the instructions are executed.

The memory 354 may be embodied as one or more volatile memory devices, one or more non-volatile memory devices, and/or a combination of one or more volatile memory devices and non-volatile memory devices. For example, the memory 354 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

In at least some embodiments, the memory 354 stores instructions for determining temperature difference across two spatial points, calculating actual rate of heat delivery across the spatial points, calculating heat delivery rate difference between target value and actual rate of heat delivery, calculating target flow rate, calculating target pumping rate, calculating target temperature and adapting flow rate of the fluid for managing the rate of heat delivery in the hydronic system 300/360/370/200. The instructions stored in the memory 354 are used by the processing module 352 to manage the rate of heat delivery to the hydronic system 300/360/370/200 as will be explained in further detail later.

The control unit 350 also includes an input/output module 364 (hereinafter referred to as an 'I/O module 364') and at least one communication module such as a communication module 366. In an embodiment, the I/O module 364 may include mechanisms configured to receive inputs from and provide outputs to the user of the control unit 350. For example, the I/O module 364 is configured to receive user input from the user 102 related to temperature requirements, rate of heat delivery, time settings, etc. To that effect, the I/O module 364 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processing module 352 may include I/O circuitry configured to control at least some functions of one or more elements of the I/O module 364, such as, for example, a speaker, a microphone, a display, and/or the like. The processing module 352 and/or the I/O circuitry may be configured to control one or more functions of the one or more elements of the I/O module 364 through computer program instructions, for example, software and/or firmware, stored on a memory, for example, the memory 354, and/or the like, accessible to the processing module 352.

The communication module 366 may include communication circuitry such as for example, a transceiver circuitry including antenna and other communication media interfaces to connect to a wired and/or wireless communication network. The communication circuitry may, in at least some example embodiments, enable transmission of data signals and/or reception of signals from other network entities, such as the database 116 (shown in FIG. 1) or other systems configured to maintain real-time information related to temperature and flow.

In at least one example embodiment, the communication module 366 is configured to (1) receive temperature from two spatially separated points (i.e., a first temperature $T_1$ and a second temperature $T_2$) in the hydronic system 200/300/360, (2) receive a flow rate f of a fluid at the inlet 305a of a heat transfer device 310 and (3) receive a temperature requirement for conditioning an enclosure, for example an indoor space either from the user (i.e., the user input) or the thermostat 216. For example, the communication module 366 may receive sensor data (e.g., temperature measurements and flow rates) from other systems configured to measure temperature/flow rate in real-time or from a database that stores near real-time information as recorded by other devices/systems coupled to the hydronic system 200/300/360. The communication module 366 may be configured to forward the temperature measurements $T_1$, $T_2$, the flow rate and the temperature requirements for the enclosure to the processing module 352. The modules of the processing module 352 in conjunction with the instructions stored in the memory 354 may be configured to process the sensor data and the temperature requirements and adapt one or more parameters (e.g., target first temperature, temperature difference, flow rate, etc.) of components in the hydronic system 200/300/360 for managing the rate of heat delivery in the hydronic system 300/360.

In at least one embodiment, the processing module 352 includes a data monitoring engine 356 and a heat transfer management engine 358. The modules of the processing module 352 may be implemented as software modules, hardware modules, firmware modules or as a combination thereof. Moreover, it shall be noted that the components are shown for exemplary purposes and the control unit 350 may include fewer or additional modules than those depicted in FIG. 3.

In one embodiment, the data monitoring engine 356 in conjunction with the instructions in the memory 354 is configured to monitor sensor data and the temperature requirements for the enclosure. In one embodiment, the engine 356 is configured to monitor temperature requirements or changes in temperature in the enclosure to determine a target rate of heat delivery $Q_t$ to the heat transfer device 310. In an illustrative example, thermal readings from the thermostat 216 are monitored to determine any change in conditioning of the enclosure. Further, the heat transfer management engine 358 is configured to calculate a target rate of heat delivery $Q_t$ based on the temperature requirements of the enclosure. In addition, the engine 356 is configured to monitor operating temperatures $T_1$, $T_2$ across two spatially separated points i.e., temperature of the fluid across two different points. The two spatially separated points (e.g., a first point $P_1$ and a second point $P_2$) correspond to different ends of a device/component across which the rate of heat delivery is to be monitored and regulated. For example, if the rate of heat delivery across the heat transfer device 310 is to be managed, temperature $T_1$ of the fluid at the inlet 305a of the heat transfer device 310 (i.e., first point $P_1$) and temperature $T_2$ at the outlet 305b of the heat transfer device 310 (i.e., second point $P_2$), are measured. Further, the data monitoring engine 356 is configured to monitor the flow rate f of the fluid at the inlet 305a of the heat transfer device 310. The sensor data are continuously monitored for determining optimal parameters so as to regulate the rate of heat delivery in the hydronic system 300/360. For example, any difference between an actual rate of heat delivery and the target rate of heat delivery in the hydronic system 300/360 initiates adaptation of system parameters (e.g., flow rate, temperature) to achieve the target rate of heat delivery in the hydronic system 300/360.

In one embodiment, the heat transfer management engine 358 in conjunction with the instructions in the memory 354 is configured to manage the rate of heat delivery in the hydronic system 300/360/370 at an optimal rate i.e., the desired rate of heat delivery for fuel efficiency. To that effect, the heat transfer management engine 358 is configured to determine the actual rate of heat delivery by the fluid to the heat transfer device 310 at predefined intervals as shown below by Equation (1).

$$Q_A = \frac{dq}{dt} = kf\Delta T \qquad \text{Equation (1)}$$

where,
k is the heat capacity per volume of the fluid, and
dq/dt is the rate of heat delivery to the hydronic system $\Delta T = T_1 - T_2$ The heat transfer management engine 358 is configured to compare an actual rate of heat delivery $Q_A$ with the target rate of heat delivery $Q_T$ to calculate a heat delivery rate difference $Q_D$ ($Q_D = Q_T - Q_A$). This delivery rate difference $Q_D$ is used to adapt one or more parameters of the hydronic system 300/360/370 that affect the heat transfer, for example, flow rate of the fluid f, temperatures $T_1/T_2$. In one embodiment, the heat transfer management engine 358 is configured to adapt the flow rate f of the fluid in the hydronic system 300. Accordingly, the heat transfer management engine 358 is configured to calculate a target flow rate $f_t$ for the fluid based on the heat delivery rate difference $Q_D$.

Referring back to FIG. 3A, the target flow rate $f_t$ is used to adapt operation of the flow modulator 330 to achieve the desired rate of heat delivery $Q_T$. The flow modulator 330 is a control element including one or more control valves and coupled to the inlet 305a of the heat transfer device 310. The heat transfer management engine 358 is configured to operate the one or more valves based on the target flow rate $f_t$ to regulate the flow of the fluid via the flow modulator 330 so as to achieve the target rate of heat delivery $Q_T$.

In another embodiment, the heat transfer management engine 358 is configured to adapt temperature i.e., temperature $T_1$ or $T_2$ of the fluid to achieve or maintain the target rate of heat delivery $Q_T$. To that effect, the flow rate f of the fluid flowing through the heat transfer device 310 has to be adapted. In one example, to adapt the temperature $T_2$ at the outlet 305b of heat transfer device 310 to a target first temperature $T_{1t}$, the heat transfer management engine 358 is configured to calculate a target flow rate $f_t$ based on the target first temperature $T_{1t}$. Further, the heat transfer management engine 358 is configured to adapt the flow rate f of the fluid by operating the flow modulator 330 at the target flow rate $f_t$. As such, when the fluid flows at the target flow rate $f_t$ through the heat transfer device 310, the temperature of the fluid at the outlet 305b of the heat transfer device 310 reaches the target first temperature $T_{1t}$, thereby regulating the rate of heat delivered to the hydronic system 300 at the target rate of heat delivery $Q_T$.

Figure 3B:
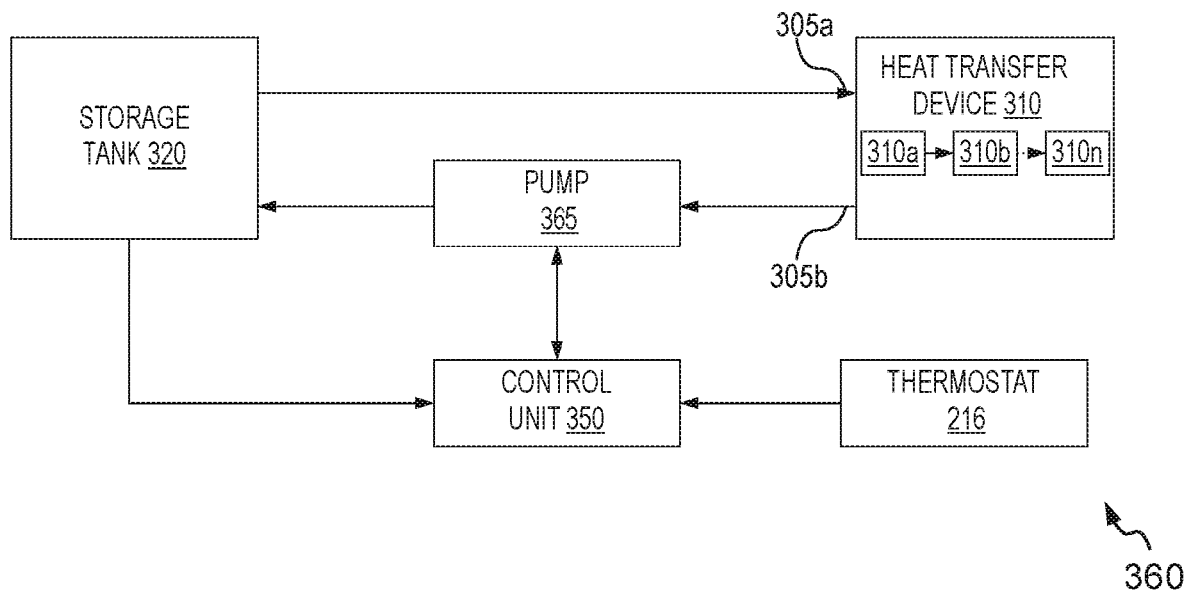
FIG. 3B is a simplified block diagram representation of a hydronic system for managing rate of heat delivery, in accordance with another example embodiment of the present disclosure.

Referring now to FIG. 3B in conjunction with FIG. 4, the heat transfer management engine 358 is configured to adapt the flow rate f of the fluid by operating a pump 365 at a target pumping rate $P_t$. The pump 365 is a control element that is configured to pump fluid from the storage tank 320 to the inlet 305a of the heat transfer device 310. More specifically, the heat transfer management engine 358 calculates the target pumping rate $P_t$ based on the heat delivery rate difference $Q_D$. During use, when the pump 365 is operated at the target pumping rate $P_t$, the flow rate f of the fluid is adapted to reach the target rate of heat delivery $Q_T$.

Alternatively, the heat transfer management engine 358 is configured to operate the pump 365 at the target pumping rate $P_t$ to achieve the target first temperature $T_{1t}$ at the outlet 305b of the heat transfer device 310. More specifically, the target pumping rate $P_t$ is calculated based on the target first temperature Tu. When the heat transfer management engine 358 detects the heat delivery rate difference $Q_D$, the target first temperature $T_{1t}$ is calculated based on the difference $Q_D$. Thereafter, the pump 365 is operated at the target pumping rate $P_t$ to adapt the temperature $T_2$ to the target first temperature $T_{1t}$. Simultaneously, adapting the temperature $T_2$ to the target first temperature $T_{1t}$, adapts the actual rate of heat delivery $Q_A$ to the target rate of heat delivery $Q_T$.

It is noted that the management of the rate of heat delivery is explained herein by adapting parameters such as, pumping rate, flow rate, target first temperature to adjust a component as they affect the rate of heat delivered to the hydronic system 300/360/370. However, it is noted that the rate of heat delivery can be adapted to the target rate of heat delivery by adapting other parameters associated with other components, for example, temperature difference, input temperature, and the like.

In an embodiment, various components of the control unit 350, such as the processing module 352, the memory 354, the I/O module 364 and the communication module 366 are configured to communicate with each other via or through a centralized circuit system 368. The centralized circuit system 368 may be various devices configured to, among other things, provide or enable communication between the components of the control unit 350. In certain embodiments, the centralized circuit system 368 may be a central printed circuit board (PCB) such as a motherboard, a main board, a system board, or a logic board. The centralized circuit system 368 may also, or alternatively, include other printed circuit assemblies (PCAs) or communication channel media.

Figure 3C:
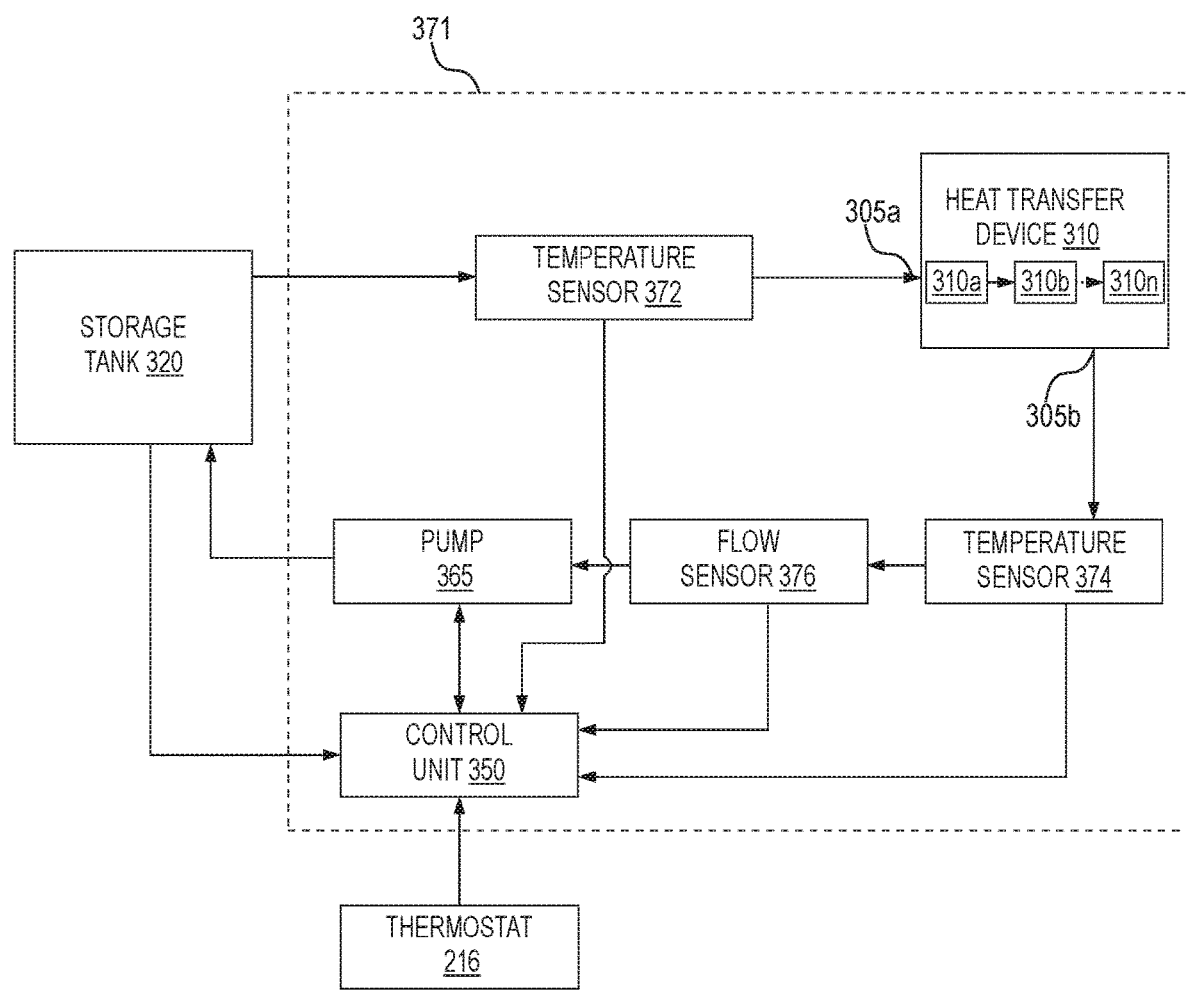
FIG. 3C is a simplified block diagram representation of a hydronic system for managing rate of heat delivery, in accordance with yet another example embodiment of the present disclosure.

FIG. 3C is a simplified block diagram representation of a hydronic system 370, in accordance with yet another embodiment of the invention. The hydronic system 370 includes a smart hydronic emitter 371. The components of the smart hydronic emitter 371 are configured to dynamically measure and manage rate of heat delivery across the heat transfer device 310. The smart hydronic emitter 371 includes one or more sensors (e.g., a first temperature sensor 372, and a second temperature sensor 374) to monitor temperature ($T_1$, $T_2$) at two spatially separated points $P_1$, $P_2$, respectively (a first point $P_1$, and a second point $P_2$), a flow sensor 376 to measure flow rate f of the fluid across the spatially separated points $P_1$, $P_2$, the heat transfer device 310, the pump 365 and the control unit 350. The operation of the smart hydronic emitter 371 to control operations of the hydronic system 370 for managing the rate of heat delivery is explained with reference to FIG. 5.

The various steps and/or operations of the flow diagram, and combinations of steps/operations in the flow diagram, may be implemented by, for example, hardware, firmware, a processor, circuitry and/or by an apparatus such as the control unit 350 explained with reference to FIGS. 1 to 4. The method 500 starts at 502.

At 502, the control unit 350 receives sensor data. More specifically, the control unit 350 receives temperature information ($T_1$, $T_2$) from two temperature sensors (see, sensors 372, 374 in FIG. 3C) spatially separated in the hydronic system 370. In general, the temperature measurements are taken across a device/component in the hydronic system 370 in which rate of heat transfer has to be reduced. Further, flow rate f of the fluid across the spatially separated points ($P_1$, $P_2$) i.e., the heat transfer device 310 is sensed by a sensor (see, the flow sensor 376 in FIG. 3C). Therefore, the sensor data includes temperature information ($T_1$, $T_2$) and flow rate f of the fluid in the hydronic system 370. It shall be noted that the sensor data can be received from external sources, for example, databases or third party sources that continuously monitor such information for the hydronic system 370.

At 503, the control unit 350 receives thermal requirements for conditioning an enclosure, for example, an indoor space. The thermal requirements may either be determined based on user input (i.e., temperature setting) or thermostat readings.

At 504, the control unit 350 calculates a target rate of heat delivery $Q_T$ for optimal functioning of the hydronic system 370 based on the thermal requirements for effective management and performance of the hydronic system 370.

At 506, the control unit 350 calculates the actual rate of heat delivery $Q_A$. At 508, the control unit 350 is configured to compare the actual rate of heat delivery $Q_A$ with the target rate of heat delivery $Q_T$. If the actual rate of heat delivery is equal to the target rate of heat delivery i.e., $Q_A=Q_T$, the control unit 350 performs no computations and continuously monitors the sensor data at predefined intervals (e.g., every 5 minutes) to determine if there are any differences between the actual rate of heat delivery $Q_A$ and the target rate of heat delivery $Q_T$.

At 510, the control unit 350 is configured to calculate heat delivery rate difference $Q_D$. If the actual rate of heat delivery is greater than the target rate of heat delivery i.e., $Q_A>Q_T$ or if the actual rate of heat delivery is lesser than the target rate of heat delivery i.e., $Q_A<Q_T$, the control unit 350 determines the heat delivery rate difference $Q_D=Q_A-Q_T$.

At 512, the control unit 350 is configured to adapt flow rate f based on heat delivery rate difference $Q_D$. The control unit 350 is configured to control operations of one or more components (e.g., flow modulator, pump) in the hydronic system 370 to regulate the rate of heat delivery such that $Q_A=Q_T$ based on the heat delivery rate difference $Q_D$. In one embodiment, the control unit 350 controls a flow modulator (e.g., the flow modulator 330) by performing steps 514-516. In another embodiment, the control unit 350 controls operations of a pump by performing steps 518-520 or steps 522-526.

At 514, the control unit 350 is configured to calculate target flow rate $f_t$ based on the heat delivery rate difference $Q_D$. At 516, the control unit 350 is configured to operate a flow modulator based on target flow rate $f_t$.

At 518, the control unit 350 is configured to calculate target pumping rate $P_t$ based on the heat delivery rate difference $Q_D$. At 520, the control unit 350 is configured to operate the pump based on the target pumping rate $P_t$.

At 522, the control unit 350 is configured to calculate a target first temperature $T_{1t}$ based on the heat delivery rate difference $Q_D$. At 524, the control unit 350 is configured to calculate a target pumping rate $P_t$ based on the target first temperature $T_{1t}$. At 526, the control unit 350 is configured to operate the pump based on the target pumping rate $P_t$.

The sequence of operations of the method 500 need not be necessarily executed in the same order as they are presented. Further, one or more operations may be grouped together and performed in form of a single step, or one operation may have several sub-steps that may be performed in parallel or in a sequential manner.

Figure 6:
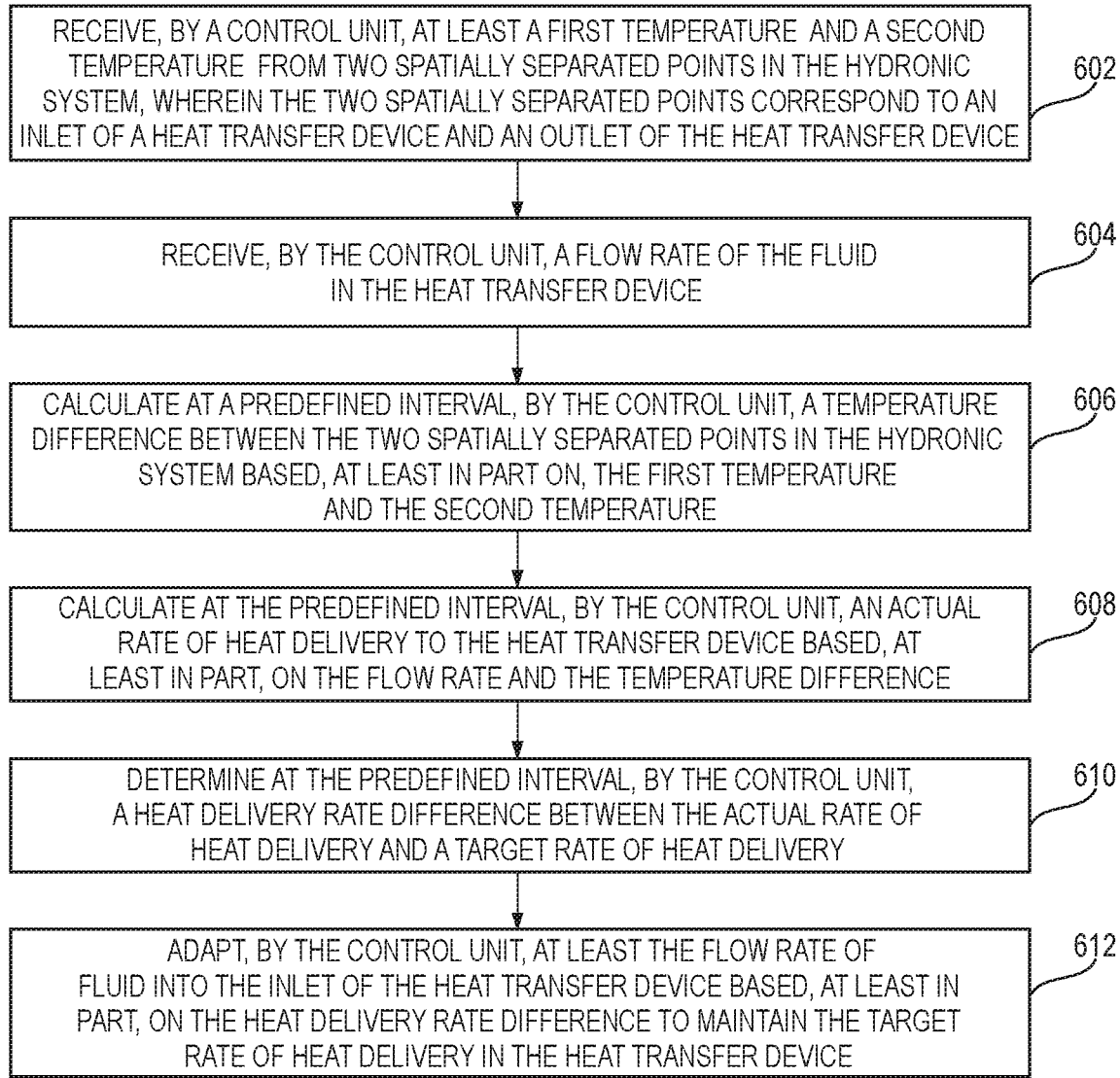
FIG. 6 is a flow diagram illustrating a method for managing rate of heat delivery to a hydronic system, in accordance with another embodiment of the present disclosure.

FIG. 6 illustrates a flow diagram of a method 600 for managing the rate of heat delivery in the hydronic system 300/360/370, in accordance with an example embodiment of the present disclosure. The various steps and/or operations of the flow diagram, and combinations of steps/operations in the flow diagram, may be implemented by, for example, hardware, firmware, a processor, circuitry and/or by an apparatus such as the control unit 350 explained with reference to FIGS. 1 to 4 and/or by a different device associated with the execution of software that includes one or more computer program instructions. The method 600 starts at 602.

At operation 602, the method 600 includes receiving, by a control unit, at least a first temperature ($T_1$) and a second temperature ($T_2$) from two spatially separated points in the hydronic system 300/360/370. The control unit 350 monitors the temperature at the two spatially separated points for managing the rate of heat delivery in the hydronic system 300/360/370. In other words, temperature measurements ($T_1$, $T_2$) are used to control the rate of heat delivery across the two spatially separated points. In one embodiment, the two spatially separated points correspond to the inlet of the heat transfer device and outlet of the heat transfer device, respectively. In general, a temperature difference across ends of the heat transfer device is determined. It shall be apparent that temperature measurements can be made across any device or component of the hydronic system 300/360/370 for managing the rate of heat delivery in the hydronic system 200. In one embodiment, the hydronic system 370 includes sensors (e.g., sensors S1, S2) to sense the temperature at respective points. For example, sensor S1 measures temperature at the inlet of the heat transfer device and the sensor S2 measures temperature at the outlet of the heat transfer device. In another embodiment, the temperature measurements ($T_1$, $T_2$) may be obtained from external sources, for example, devices/systems capable of measuring temperatures ($T_1$, $T_2$) at two spatially separated points.

At operation 604, the method 600 includes receiving, by the control unit, a flow rate 'f' of fluid pumped from the storage tank to the inlet of the heat transfer device. In one embodiment, the flow rate 'f' of the fluid may be sensed by a flow sensor. In some cases, a flow sensor may be omitted in favor of pre-calibration of the pump. In other words, the pump speed control provides sufficiently accurate knowledge of the flow rate 'f' of the fluid and may not require the use of the flow sensor.

At operation 606, the method 600 includes calculating, by the control unit, at a predefined interval a temperature difference between the two spatially separated points in the hydronic system 300/360/370 based, at least in part on, the first temperature and the second temperature. The change in temperature ΔT affects the rate of heat delivery in hydronic systems and can be determined based on measured temperatures at respective points. To that effect, the change in temperature $\Delta T = T_1 - T_2$ across the spatially separated points is calculated as the temperature difference between the temperatures measured at corresponding points. As such, the control unit 350 is configured to read sensor data (i.e., temperature $T_1$, $T_2$ and flow rate f) at predefined intervals, for example, every 2 minutes for managing the rate of heat delivery in the hydronic system 300/360/370. However, it shall be apparent that depending on application or configuration, the control unit 350 may continuously monitor parameters of the hydronic system 300/360/370 for dynamically managing the rate of heat delivery in the hydronic system 300/360/370.

At operation 608, the method 600 includes calculating, by the control unit, at the predefined interval an actual rate of heat delivery to the heat transfer device based, at least in part, on the flow rate f and the temperature difference ΔT. For example, measurement of f and ΔT can determine the rate of heat delivery to (or from) the hydronic system or sub-system in real (or near-real) time as shown below in equations (2), (3) and (4).

$$\frac{dq}{dt} \alpha f \qquad \text{Equation (2)}$$

$$\frac{dq}{dt} \alpha (T_1 - T_2) \qquad \text{Equation (3)}$$

$$Q = \frac{dq}{dt} = kf(T_1 - T_2) \qquad \text{Equation (4)}$$

where,
k is the heat capacity per volume of the fluid, and
dq/dt is the rate of heat delivery to the hydronic system.

In one non-limiting example, if the fluid flow rate f is 0.33 gallons per minute and fluid temperatures ($T_1$, $T_2$) at the two spatially separated points are 140° F. and 80° F. and assuming the fluid to be water, the heat capacity is 8.33 BTU/gallon. The actual rate of heat delivery $Q_A$ is 9900 BTU/hour ($Q_1$=8.33 BTU/gallon*0.33 gallon/minute*(140° F.–80° F.)*60 minute/hour=9900 BTU/hour).

At operation 610, the method 600 includes determining, by the control unit, at the predefined intervals a heat delivery rate difference between the actual rate of heat delivery and a target rate of heat delivery. The actual rate of heat delivery $Q_A$ corresponds to rate of heat delivered at a current instant in the hydronic system and the target rate of heat delivery $Q_T$ corresponds to a desired rate of heat delivery in the hydronic system 300. In one embodiment, the target rate of heat delivery $Q_T$ may be determined based on a thermostat input that manages temperature requirements for conditioning an enclosure, such as, a house. Alternatively, the user can provide user inputs to provide a desired temperature in the enclosure and the target rate of heat delivery $Q_T$ is determined based on the temperature requirements for maintenance of optimal working, fuel efficiency and cost reductions. For example, the user may preset the rate of heat delivery (i.e., target rate of heat delivery $Q_T$) at 9,500 BTU/hr to optimize usage of fuel in the hydronic system 200. In one example, if the actual rate of heat delivery ($Q_A$) is 9,900 BTU/hr, the heat delivery rate difference $Q_d$ is 400 BTU/hr (d=9,900-9,500 BTU/hr=400 BTU/hr).

At operation 612, the method 600 includes adapting, by the control unit, at least the flow rate of fluid into the inlet of the heat transfer device based, at least in part, on the heat delivery rate difference $Q_d$ to maintain the target rate of heat delivery $Q_T$ in the heat transfer device. As seen from equation 3, the actual rate of heat delivery $Q_A$ can be regulated to the target rate of heat delivery $Q_T$ by adapting parameters, for example, flow rate for temperatures $T_1$, $T_2$. In one embodiment, a target flow rate $f_t$ for maintaining the target rate of heat delivery $Q_T$ is calculated based on the heat delivery rate difference $Q_d$ for adapting the flow rate f More specifically, a flow modulator is configured at the inlet of heat transfer device for modulating/controlling the flow rate of the fluid into the inlet of the heat transfer device. The flow modulator includes one or more valves that may be controlled by a control circuit, for example, the control unit 350 for regulating the rate of heat delivery in the hydronic systems 300/360/370. Accordingly, the control unit 350 is configured to operate the flow modulator or the valves in the flow modulator to achieve the target flow rate $f_t$. In another embodiment, the control unit 350 calculates a target pumping rate $P_t$ for achieving the target rate of heat delivery $Q_T$. The target pumping rate $P_t$ is used to adapt the flow rate into the inlet of the heat transfer device by operating a pump that pumps fluid from the storage tank to the heat transfer device.

As already explained, input/output temperatures ($T_1$, $T_2$) at the inlet/outlet of the heat transfer device or temperature difference may be adapted to maintain the target rate of heat delivery $Q_t$. As such, for adapting the temperature $T_2$ at the outlet of the heat transfer device, the flow rate f in the heat transfer device has to be suitably adapted. In one embodiment, a target first temperature $T_{1t}$ for achieving the target rate of heat delivery $Q_t$ is calculated by the control unit 350. The target first temperature $T_{1t}$ is used for calculating the target flow rate $f_t$ into the inlet of the heat transfer device and the flow modulator is suitably adapted based on the target flow rate $f_t$. Alternatively, a target pumping rate $P_t$ for achieving the target rate of heat delivery $Q_T$ is calculated based on the target first temperature $T_{1t}$. Thereafter, a pumping rate of the pump is adapted to the target pumping rate $P_t$ for achieving the target rate of heat delivery $Q_T$. It shall be noted that adapting the parameters that affect the rate of heat delivery (e.g., flow rate f, temperatures $T_1$, $T_2$) is an iterative process that requires continuous monitoring of the parameters and dynamically adapting them to achieve the target rate of heat delivery.

Figure 7:
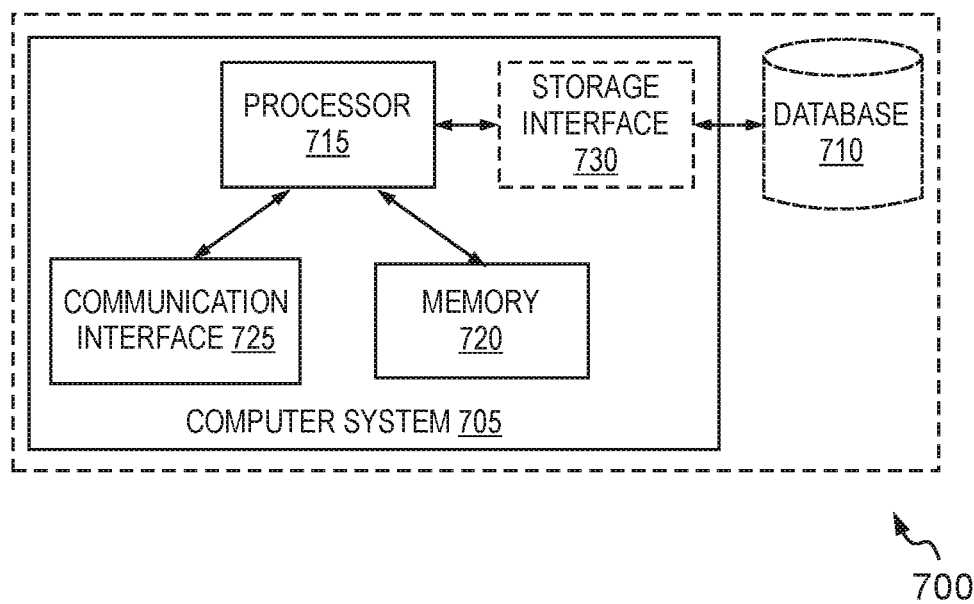
FIG. 7 is a block diagram of a server system capable of implementing at least some embodiments of the present disclosure.

FIG. 7 illustrates a block diagram representation of a server system 700 capable of implementing at least some embodiments of the present disclosure. The server system 700 is configured to host and manage the application 114 that is provided to an electronic device such as the device 104, in accordance with an example embodiment of the disclosure. An example of the server system 700 is the server system 108 shown and described with reference to FIG. 1. The server system 700 includes a computer system 705 and a database 710.

The computer system 705 includes at least one processor 715 for executing instructions. Instructions may be stored in, for example, but not limited to, a memory 720. The processor 715 may include one or more processing units (e.g., in a multi-core configuration).

The memory 720 is a storage device embodied as one or more volatile memory devices, one or more non-volatile memory devices, and/or a combination of one or more volatile memory devices and non-volatile memory devices, for storing micro-contents information and instructions. The memory 720 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The processor 715 is operatively coupled to a communication interface 725 such that the computer system 705 is capable of communicating with a mobile device, for example, the device 104 or communicates with any entity within the network 106 via the communication interface 725.

The processor 715 may also be operatively coupled to the database 710. The database 710 is any computer-operated hardware suitable for storing and/or retrieving data, such as, but not limited to, the user input, the temperature data, the load data, data obtained during operation of the system 200/300 and the like. The database 710 may include multiple storage units such as hard disks and/or solid-state disks in a redundant array of inexpensive disks (RAID) configuration. The database 710 may include a storage area network (SAN) and/or a network attached storage (NAS) system.

In some embodiments, the database 710 is integrated within the computer system 705. For example, the computer system 705 may include one or more hard disk drives as the database 710. In other embodiments, the database 710 is external to the computer system 705 and may be accessed by the computer system 705 using a storage interface 730. The storage interface 730 is any component capable of providing the processor 715 with access to the database 710. The storage interface 730 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 715 with access to the database 710.

The processor 715 is communicably coupled with the memory 720 and the communication interface 725. The processor 715 is capable of executing the stored machine executable instructions in the memory 720 or within the processor 715 or any storage location accessible to the processor 715. The processor 715 may be embodied in a number of different ways. In an example embodiment, the processor 715 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. The processor 715 performs various functionalities of the server system 700 as described herein.

The disclosed methods with reference to FIGS. 1 to 7, or one or more operations of the flow diagrams 500 and 600 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), mobile communications, or other such communication means.

Various embodiments disclosed herein provide numerous advantages. More specifically, the embodiments disclosed herein suggest techniques for managing rate of heat delivery in hydronic systems. The control unit adapts parameters that affect the rate of heat delivery of the hydronic system to manage the rate of heat delivery. Various embodiments describe adapting different parameters based on a target rate of heat delivery so the rate of heat delivery is regulated to the target rate of heat delivery. Further, feedback to the hydronic system to adjust temperature, flow rate or temperature difference can be used to seek a targeted rate of heat delivery. Moreover, the control circuit ensures nominal performance levels of the hydronic system by establishing a balance of fluid flow and heat delivery for typical conditions. Such adaptation of the parameters of the hydronic system ensures efficient performance and fuel usage thereby reducing the costs associated with operating the hydronic system.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A hydronic system, comprising:
   a forced air heat delivery component configured to control flow of air in the hydronic system;
   a control unit for managing a rate of heat delivery across two spatially separated points in the hydronic system, the control unit being operatively coupled with the forced air heat delivery component, the control unit comprising:
   a communication module configured to:
      receive at least a first temperature and a second temperature of a fluid from a first point and a second point, respectively in the hydronic system, wherein the first point and the second point correspond to the two spatially separated points; and
      receive a flow rate of the fluid across the two spatially separated points;
   a memory comprising stored instructions; and
   a processing module communicably coupled to the memory and the communication module, the processing module configured to execute the stored instructions to cause the hydronic system to perform at least:
      calculating an actual rate of heat delivery in the two spatially separated points based, at least in part, on flow rate and temperature difference of the fluid in the two spatially separated points;
      determining a heat delivery rate difference between the actual rate of heat delivery and a target rate of heat delivery; and
      adapting at least the flow rate of the fluid flowing between the two spatially separated points and operating the forced air heat delivery component for adapting a rate of the flow of air in the hydronic system, based, at least in part, on the heat delivery rate difference to maintain the target rate of heat delivery.

2. The hydronic system as claimed in claim 1, wherein the first point corresponds to an inlet of a heat transfer device and the second point corresponds to an outlet of the heat transfer device.

3. The hydronic system as claimed in claim 2, wherein for adapting at least the flow rate of the fluid between the two spatially separated points, the control unit is further configured to calculate a target flow rate based, at least in part, on the heat delivery rate difference.

4. The hydronic system as claimed in claim 3, further comprising:
   at least one flow modulator configured at the inlet of the heat transfer device, wherein the control unit is configured to adapt the flow rate of the fluid into the inlet of the heat transfer device based on the target flow rate.

5. The hydronic system as claimed in claim 2, wherein for adapting at least the flow rate of the fluid between the two spatially separated points, the control unit is further configured to calculate a target pumping rate based, at least in part, on the heat delivery rate difference.

6. The hydronic system as claimed in claim 5, further comprising:
   at least one pump operatively coupled to a storage tank for pumping the fluid from the storage tank to the heat transfer device, wherein the control unit is configured to modify a pumping rate of the at least one pump based on the target pumping rate.

7. The hydronic system as claimed in claim 2, wherein for adapting at least the flow rate of the fluid between the two spatially separated points, the control unit is further configured to:
   calculate a target first temperature at the outlet of the heat transfer device based, at least in part, on the heat delivery rate difference;
   calculate a target pumping rate based, at least in part, on the target first temperature; and
   operate at least one pump at the target pumping rate for adapting the flow rate of the fluid into the inlet of the heat transfer device, wherein the at least one pump is operatively coupled to a storage tank for pumping fluid from the storage tank to the heat transfer device.

8. The hydronic system as claimed in claim 2, wherein the control unit is further configured to:
   calculate a target first temperature at the outlet of the heat transfer device based, at least in part, on the heat delivery rate difference;
   calculate a target flow rate based, at least in part, on the target first temperature; and
   operate at least one flow modulator for adapting the flow rate of the fluid into the inlet of the heat transfer device based on the target flow rate, wherein the at least one flow modulator is configured at the inlet of the heat transfer device.

9. The hydronic system as claimed in claim 1, wherein the target rate of heat delivery is based, at least in part, on temperature requirements for conditioning an enclosure.

10. A hydronic system, comprising:
a heat transfer device;
a forced air heat delivery component configured to control flow of air in the hydronic system;
at least one pump operatively coupled to a storage tank for pumping fluid from the storage tank to the heat transfer device; and
a control unit operatively coupled to the heat transfer device, a forced air heat delivery component, and the at least one pump, wherein the control unit is configured to perform the following steps at predefined intervals:
  receiving at least a first temperature and a second temperature from two spatially separated points in the hydronic system, wherein the first temperature corresponds to temperature of the fluid entering an inlet of the heat transfer device and the second temperature corresponds to temperature of the fluid leaving an outlet of the heat transfer device;
  receiving a flow rate of the fluid in the heat transfer device;
  calculating a temperature difference between the two spatially separated points in the hydronic system based, at least in part on, the first temperature and the second temperature;
  calculating an actual rate of heat delivery in the heat transfer device based, at least in part, on the flow rate and the temperature difference;
  determining a heat delivery rate difference between the actual rate of heat delivery and a target rate of heat delivery;
  calculating a target pumping rate based, at least in part, on the heat delivery rate difference; and
  maintaining the target rate of heat delivery in the heat transfer device by:
    operating the at least one pump at the target pumping rate for adapting at least the flow rate of the fluid into the inlet of the heat transfer device; and
    operating the forced air heat delivery component for adapting a rate of the flow of air in the hydronic system.

11. The hydronic system as claimed in claim 10, wherein for calculating the target pumping rate, the control unit is further configured to:
calculate a target first temperature at the outlet of the heat transfer device based, at least in part, on the heat delivery rate difference; and
calculate the target pumping rate for operating the at least one pump based, at least in part, on the target first temperature.

12. The hydronic system as claimed in claim 10, wherein a first sensor measures the first temperature and a second sensor measures the second temperature at the two spatially separated points.

13. The hydronic system as claimed in claim 10, wherein the flow rate of the fluid is measured by a flow sensor configured at the outlet of the heat transfer device.

14. The hydronic system as claimed in claim 10, wherein the heat transfer device is at least one of:
hydronic panels;
radiators;
air handler; and
radiant floor.

15. A method for controlling rate of heat delivery in a hydronic system, the method comprising:
  receiving, by a control unit, at least a first temperature and a second temperature from two spatially separated points in the hydronic system, wherein the two spatially separated points correspond to an inlet of a heat transfer device and an outlet of the heat transfer device;
  receiving, by the control unit, a flow rate of fluid in the heat transfer device;
  calculating at a predefined interval, by the control unit, a temperature difference between the two spatially separated points in the hydronic system based, at least in part, on the first temperature and the second temperature;
  calculating at the predefined interval, by the control unit, an actual rate of heat delivery to the heat transfer device based, at least in part, on the flow rate and the temperature difference;
  determining at the predefined interval, by the control unit, a heat delivery rate difference between the actual rate of heat delivery and a target rate of heat delivery; and
  adapting, by the control unit, at least the flow rate of the fluid into the inlet of the heat transfer device and a rate of flow of air in the hydronic system based, at least in part, on the heat delivery rate difference to maintain the target rate of heat delivery in the heat transfer device.

16. The method as claimed in claim 15, wherein adapting at least the flow rate of the fluid into the inlet of the heat transfer device comprises:
calculating, by the control unit, a target flow rate based, at least in part, on the heat delivery rate difference.

17. The method as claimed in claim 16, further comprising:
adapting, by the control unit, the flow rate of the fluid based on the target flow rate, wherein at least one flow modulator is configured at the inlet of the heat transfer device for adapting the flow rate.

18. The method as claimed in claim 15, wherein adapting at least the flow rate of the fluid into the inlet of the heat transfer device further comprises:
calculating, by the control unit, a target pumping rate for operating at least one pump based, at least in part, on the heat delivery rate difference.

19. The method as claimed in claim 18, further comprising:
operating, by the control unit, the at least one pump at the target pumping rate for adapting the flow rate of the fluid into the inlet of the heat transfer device, wherein the at least one pump is operatively coupled to a storage tank for pumping the fluid from the storage tank to the heat transfer device.

20. The method as claimed in claim 15, further comprising:
calculating, by the control unit, a target first temperature at the outlet of the heat transfer device based, at least in part, on the heat delivery rate difference;
calculating, by the control unit, a target pumping rate for operating at least one pump based, at least in part, on the target first temperature; and
operating, by the control unit, the at least one pump at the target pumping rate for adapting the flow rate of the fluid into the inlet of the heat transfer device, wherein the at least one pump is operatively coupled to a storage tank for pumping the fluid from the storage tank to the heat transfer device.

* * * * *